(12) United States Patent
Tanner (10) Patent No.: US 7,479,713 B2
(45) Date of Patent: *Jan. 20, 2009

(54) SYSTEMS AND METHODS FOR REDUCING POWER DISSIPATION IN A DISK DRIVE INCLUDING A FIXED OUTPUT VOLTAGE REGULATOR

(75) Inventor: Brian K. Tanner, San Jose, CA (US)

(73) Assignee: Panasonic Corporation, Osaka (JP)

( * ) Notice: Subject to any disclaimer, the term of this patent is extended or adjusted under 35 U.S.C. 154(b) by 716 days.

This patent is subject to a terminal disclaimer.

(21) Appl. No.: 10/984,707

(22) Filed: Nov. 9, 2004

(65) Prior Publication Data

US 2006/0098556 A1    May 11, 2006

(51) Int. Cl.
*H02J 1/00* (2006.01)
*G05F 1/10* (2006.01)

(52) U.S. Cl. .............. 307/31; 307/36; 307/39; 307/98; 307/99; 323/286; 323/287; 323/288

(58) Field of Classification Search .......... 307/98, 307/99, 31, 38, 39; 323/286, 287, 288
See application file for complete search history.

(56) References Cited

U.S. PATENT DOCUMENTS

| | | | |
|---|---|---|---|
| 3,566,254 A * | 2/1971 | Griffin | 323/280 |
| 4,672,232 A | 6/1987 | Schoen | |
| 5,241,430 A | 8/1993 | Janz | |
| 5,528,127 A | 6/1996 | Streit | |
| 5,671,149 A | 9/1997 | Brown | |
| 5,729,061 A | 3/1998 | Narita | |
| 5,737,144 A | 4/1998 | Ataee et al. | |
| 5,856,740 A | 1/1999 | Rau et al. | |
| 5,919,262 A | 7/1999 | Kikinis et al. | |
| 6,054,847 A | 4/2000 | Garcia | |
| 6,226,136 B1 | 5/2001 | Chern | |
| 6,232,753 B1 * | 5/2001 | Pasotti et al. | 323/267 |
| 6,259,172 B1 | 7/2001 | Lee | |
| 6,304,066 B1 | 10/2001 | Wilcox et al. | |
| 6,316,988 B1 | 11/2001 | Forehand et al. | |
| 6,337,597 B2 | 1/2002 | Fujikawa | |
| 6,411,069 B1 | 6/2002 | Hollmer | |
| 6,483,656 B1 | 11/2002 | Sakai et al. | |
| 6,693,413 B1 | 2/2004 | Lanni | |

(Continued)

OTHER PUBLICATIONS

"Linear Voltage Regulator," Introductory Electronics Notes, The University of Michigan-Dearborn, pp. 300-1/300-12, Copyright M.H. Miller: 2000 revised.

(Continued)

*Primary Examiner*—Michael J Sherry
*Assistant Examiner*—Hal I Kaplan
(74) *Attorney, Agent, or Firm*—Fliesler Meyer LLP (57) ABSTRACT

A disk drive system includes a fixed output voltage regulator including an output terminal that provides a substantially fixed output voltage. A pluralities of loads are connected in parallel. A resistor is connected in series between the output terminal of the voltage regulator and the plurality of loads. The resistor causes a voltage provided to the plurality of loads to sag, as compared to the substantially fixed output voltage, when current is pulled, by one or more of the loads, through the resistor.

6 Claims, 7 Drawing Sheets

U.S. PATENT DOCUMENTS

| | | |
|---|---|---|
| 6,727,681 B2 | 4/2004 | Morita |
| 6,975,256 B1 | 12/2005 | Bolda et al. |
| 7,099,167 B2 * | 8/2006 | Fujise .................. 363/62 |
| 2002/0070717 A1 | 6/2002 | Pellegrino |
| 2004/0080360 A1 | 4/2004 | Bedarida et al. |
| 2004/0135562 A1 | 7/2004 | Oden |

OTHER PUBLICATIONS

"LM117/217/317, 1.2V to 37V Voltage Regulator," SGS-Thomson Microelectronics, pp. 1/11-11/11, Jan. 1998.

"Linear & Switching Voltage Regulator Handbook," ON Semiconductor, HB206/D Rev.4, pp. 1-35, Feb. 2002.

* cited by examiner

SYSTEMS AND METHODS FOR REDUCING POWER DISSIPATION IN A DISK DRIVE INCLUDING A FIXED OUTPUT VOLTAGE REGULATOR

CROSS REFERENCE TO RELATED APPLICATIONS

The present application is related to the following commonly assigned application, which was filed on the same day as the present application, and which is incorporated herein by reference: U.S. application patent Ser. No. 10/984,706, entitled SYSTEMS AND METHODS FOR DYNAMICALLY AFFECTING POWER DISSIPATION IN A DISK DRIVE INCLUDING A FIXED OUTPUT VOLTAGE REGULATOR.

FIELD OF THE INVENTION

The present invention relates generally to disk drive devices, and more specifically, to reducing power consumption in such devices.

BACKGROUND OF THE INVENTION

Over the past few years, notebook computers have become progressively thinner and lighter, and battery technology has improved significantly; but, though both thinner and lighter, notebook computers have incorporated ever-more powerful CPUs, larger and higher resolution screens, more memory and higher capacity hard disk drives. Feature-rich models include a number of peripherals such as high-speed CD-ROM drives, DVD drives, fax/modem capability, and a multitude of different plug-in PC cards. Each of these features and improvements creates demand for power from system batteries. Many portable electronics, such as MP3 players and personal digital assistants, now use rotatable data storage devices as well, and by their nature and size place great demands for power on batteries.

Accordingly, there is a continued need to find additional ways to reduce the demand on batteries. Some disk drive manufacturers have employing power savings schemes that save power at the expense of performance. It would be beneficial to further reduce power dissipation in disk drives. It would be beneficial if such power saving features did not affect performance.

SUMMARY OF THE INVENTION

Disk drives often include fixed output voltage regulators and/or adjustable output voltage regulators to power the various functional blocks or components (collectively referred to as loads) within the drives. Each regulator can be responsible for powering a single load, or more likely, multiple loads.

For example, many separate loads of a disk drive system are often powered by a substantially fixed output voltage of a fixed output voltage regulator. Typically, the power dissipated by the fixed output voltage regulator and the loads is greater than is necessary to operate the loads. Embodiments of the present invention are directed to systems and methods for reducing power dissipation in such environments.

For another example, many separate loads of a disk drive system are often powered by the output voltage of an adjustable output voltage regulator. However, even when using an adjustable output voltage regulator, typically, the power dissipated by the adjustable output voltage regulator and the loads is greater than is necessary to operate the loads. Embodiments of the present invention are also directed to systems and methods for reducing power dissipation in these environments.

Anywhere between none to all of the loads, powered by a single voltage regulator, can be active at one time. In accordance with embodiments of the present invention, the loads are monitored to determine which loads are active. Then based on which loads are active, adjustments are performed to make sure that each active load is sufficiently powered, but without wasting power.

Further embodiments, and the features, aspects, and advantages of the present invention will become more apparent from the detailed description set forth below, the drawings and the claims.

DETAILED DESCRIPTION

Embodiments of the present invention relate disk drives, and more specifically, to ways for reducing power consumption by disk drives.

Fixed Output Voltage Regulators

A disk drive (e.g., a hard disk drive or an optical disk drive) often includes one or more fixed output voltage regulator circuits. For example, there may be one voltage regulator that provides a fixed 3.3V output (+/− some tolerance), and another voltage regulator that provides a fixed 1.2V output (+/− some tolerance). The 3.3V regulator may be used, for example, to power DRAM, flash memory, and the interface portions of a system ASIC, while the 1.2V regulator may be used, for example, to power the digital logic within the system ASIC.

Figure 1:
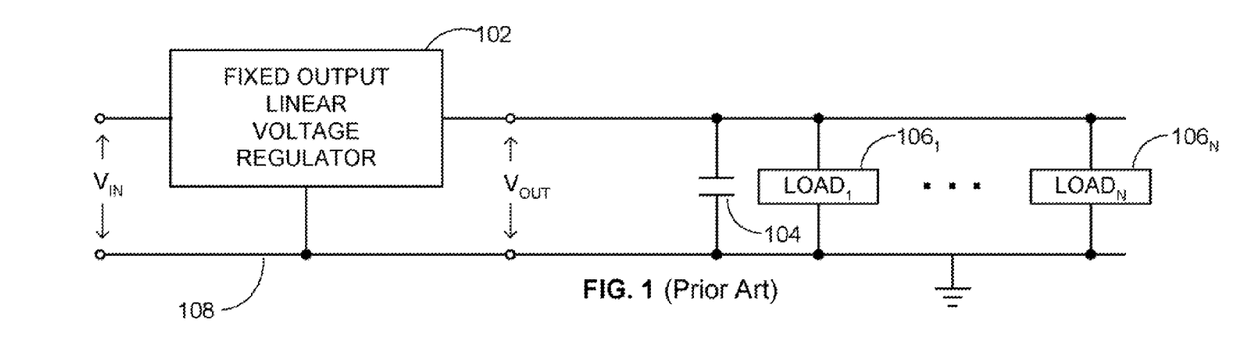
FIG. 1 is a high level block diagram that is useful for understanding how a fixed output linear voltage regulator can be used to drive multiple loads of a disk drive device.

FIG. 1 shows a fixed output linear voltage regulator 102 that is used to drive multiple loads $106_1 \ldots 106_N$ (of a disk drive system), which can be treated as multiple parallel loads. The loads 106 can be, for example, an DRAM, a host interface, a front end of a read/write channel, and/or any of the other numerous blocks or components of a disk drive system. Each of the loads $106_1 \ldots 106_N$ may be active (and thus pull a current) or inactive (and thus pull no or minimal current) at any given time. In other words, none, some, or all of the loads can active at one time. When active, a load requires at least its minimum operating voltage and its minimum operating current in order to operate properly.

For completeness, a decoupling capacitance 104, which is often placed between a regulator and a load(s), is also shown. The linear voltage regulator 102 receives an input voltage ($V_{IN}$), which can be, for example, about 5V. As can be seen from FIG. 1 (and FIGS. 3-6) the low rail voltage 108 for the linear voltage regulator (which can be ground) is typically the same low rail voltage of the loads 106. The internal components of the fixed output linear voltage regular are designed such that the regulator will provide a substantially fixed output, which can be, for example, 3.3V +/−0.03V, regardless of swings in $V_{IN}$. In order to do this, there is typically a feedback signal within the linear voltage regulator that enables an output to be compared to a target or reference voltage, in order to create an error signal for increasing or decreasing the output. This will now be explained in more detail with reference to FIG. 2.

Figure 2:
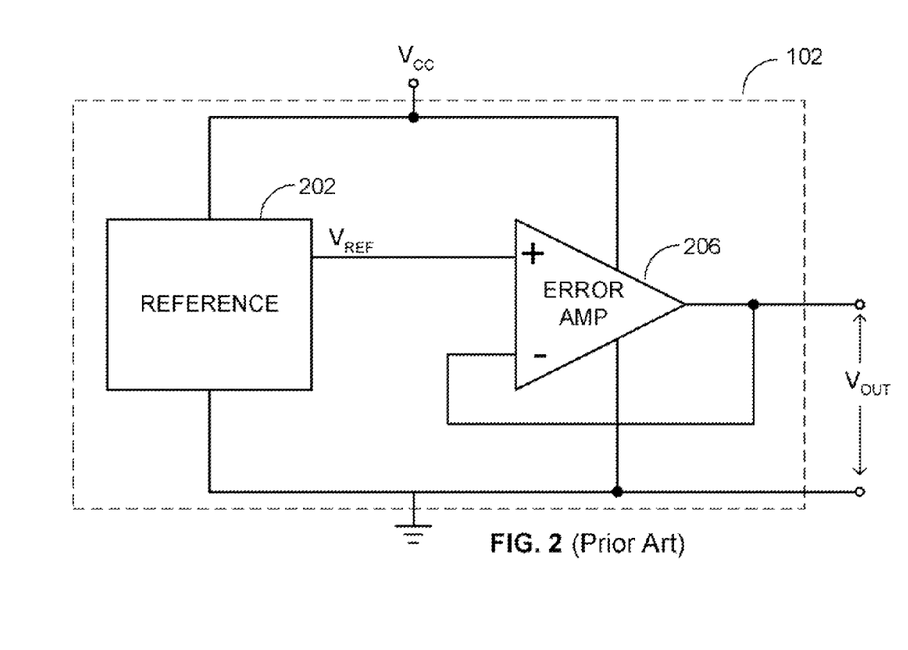
FIG. 2 is a high level functional block diagram of a typical fixed output linear voltage regulator.

FIG. 2, which is a functional block diagram of a typical fixed output linear voltage regulator, is useful for understanding how such regulators operate. FIG. 2 is just an exemplary model of a fixed output linear voltage regulator, which is not meant to limit the scope of the present invention. A reference block 202 produces a stable reference voltage ($V_{REF}$) that should not be (or only minimally is) affected by changes in temperature, age, voltage input ($V_{IN}$), etc. There are well known circuits for producing the stable reference block 202 (e.g., using zener diodes), which need not be described herein. The stable reference voltage $V_{REF}$ is provided to an input (e.g., a non-inverting input) of an amplifier 206. The other input (e.g., the inverting input) of the amplifier 206 receives an amplifier output voltage ($V_{OUT}$) as a feedback signal. The output voltage ($V_{OUT}$), through use of the feedback, remains substantially fixed, +/− a tolerance (e.g., +/−1%).

Fixed output linear voltage regulators are designed such that they do not allow the reference or target voltage ($V_{REF}$), and thus the output voltage ($V_{OUT}$), to be adjusted. Fixed output regulators can be, for example, off-the shelf stand alone regulators, or voltage regulators that are built into ASICS that include additional functionality. These types of voltage regulators are often incorporated into disk drives because they are easy to use, inexpensive, and do not require circuit adjustments.

On the other hand, fixed output voltage regulators have some inherent disadvantages. For example, even if it is determined that loads driven by the regulator (e.g., loads $106_1 \ldots 106_N$ in FIG. 1) do not require an operating voltage as high as the fixed $V_{OUT}$, fixed voltage regulators do not provide a mechanism for adjusting the target output (i.e., for adjusting $V_{REF}$). This results in excess or wasted power dissipation. Specific embodiments of the present invention are useful for reducing overall power dissipation when using a linear voltage regulator in which the reference (also known as target) voltage, and thus output voltage ($V_{OUT}$), is not readily adjustable. Such embodiments shall now be described beginning with reference to FIG. 3A.

Figure 3A:
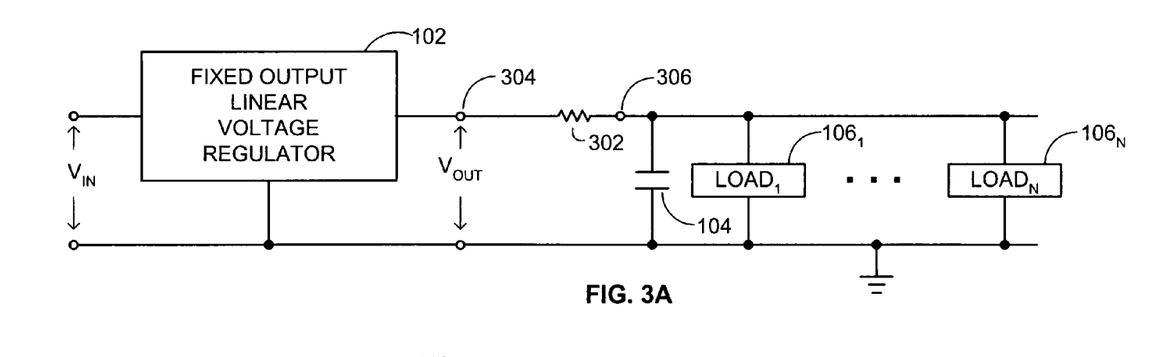
FIGS. 3A-3C and 4 illustrate embodiments of the present invention that are useful for reducing power dissipation in an environment including a fixed output linear voltage regulator.

FIG. 3A is identical to FIG. 1, except for the addition of a resistor 302 connected in series between an output node 304 of the linear voltage regulator and the parallel loads $106_1 \ldots 106_N$. Referring to FIG. 3A, the resistor 302 will cause the voltage at node 306 to be less than the voltage at node 304, which is $V_{OUT}$. In other words, the resistor 302 will cause the voltage at node 306 (and thus the voltage across parallel loads 106) to be less than the output voltage $V_{OUT}$ of the linear voltage regulator 102. This will result in less power being dissipated by the entire system, because less current will flow through the loads $106_1 \ldots 106_N$, and less voltage will drop across loads the $106_1 \ldots 106_N$, resulting in less current being drawn from the linear voltage regulator 102 (due to conservation of current). It is noted that there will be some power dissipated by the added resistor 302. However, the power dissipated by the resistor 302 is miniscule compared to the power saved.

Various factors should be taken into account when selecting an appropriate value for the resistor 302. The characteristics of the downstream loads $106_1 \ldots 106_N$, that will be driven by the output of the particular voltage regulator 102, should be taken into account. The characteristics of interest, which are typically published by manufacturers of the loads, include the minimum operating voltage necessary and the minimum operating current necessary to operate each load. For this embodiment, in order to ensure that each of the loads can be driven, the voltage at node 306 should not drop or sag below the highest of these minimum operating voltages. Further, it should be assumed that there will be times when all the loads $106_1 \ldots 106$N will pull current at the same time (i.e., under maximum load condition). In other words, it should be assumed that a total or maximum current, equal to all the minimum operating currents added together, may be drawn at one time (i.e., at the same time) from the voltage regulator 102. A further factor to be taken into account is the minimum output voltage that the voltage regulator 102 will output (e.g., a 3.3V voltage regulator that has tolerance of +/−0.03V, has a minimum output voltage of 3.27V).

Taking the above factors into account, the value for the resistor 302 can be selected. This can be accomplished by first determining the voltage difference between the minimum output voltage of the regulator 102 (i.e., assume a weak regulator) and the highest minimum operating load voltage. For example, if the voltage regulator 102 has a minimum output voltage of 3.27V, and the highest minimum operating voltage associated with the parallel loads voltage is 3.12V, then the voltage difference is 0.15V (i.e., 3.27−3.12 =0.15). Using ohms law (i.e., V=IR), a value for the resistor 302 can be calculated by dividing this voltage difference (e.g.,0.15V) by the maximum amount of current that may be pulled by loads $106_1 \ldots 106_N$ at one time (i.e., under maximum load condition). To be safe, the value of the resistor can be made slightly lower than the calculated value.

The above described embodiment provides an easy and inexpensive way of reducing power dissipation, when using a fixed output voltage regulator. In the above described embodiment, a fixed resistance is placed in series between the fixed output of the voltage regulator 102 and the loads 106. As will be discussed below with reference to FIGS. 3B and 3C, various circuit elements can be used in place of the resistor 302. However, adjustable resistance embodiments will first be discussed with reference to FIG. 4.

Figure 4:
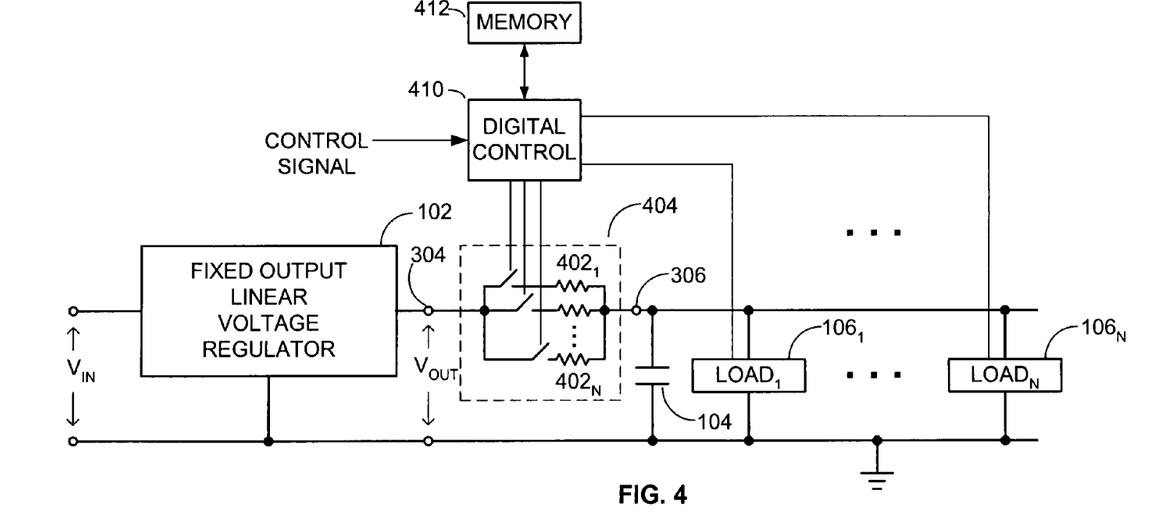

Referring to FIG. 4, in accordance with another embodiment of the present invention, an adjustable resistance is used to dynamically adjust the drive voltage at node 306. Such an adjustable resistance can be accomplished, for example, using a resistor bank 402, which includes a plurality of switchable or selectable resistors $402_1 \ldots 402_N$ in parallel. For example, each resistor has a respective switch, as shown in FIG. 4. The switches can be implemented, for example, using transistors. Each resistor 402 can have the same weighted resistance, or more likely, each resistor 402 is differently weighted to provide for a wider range of possible resistances. The resistors 402 can be weighted in a progressive fashion (e.g., R, 2R, 3R, 4R), a binary fashion (e.g., R, 2R, 4R, 8R), or in any other arrangement. The values of the resistors can even be selected such that a specifically calculated resistance value can be achieved for every possible combination of loads $106_1 \ldots 106_N$. The appropriate or desired resistance preferably produces a voltage at node 306, which is equal to or slightly greater than the highest minimum voltage associated with an active load, as well as provide a current sufficient to operate all the active loads. Preferably this current is only slightly greater than the minimum operating currents of the active loads added together.

In accordance with an embodiment of the present invention, a digital controller 410 receives a control signal that specifies which resistor(s) (e.g., within the resistor bank 402) is/are to be selected (e.g., which switches are to be closed). Alternatively, the control signal specifies a desired resistance, and then the digital controller 410 determines and selects the appropriate resistors to achieve the desired resistance (or the closest to the desired resistance as possible). In another embodiment, the digital controller 410 receives an indication as to which of the loads $106_1 \ldots 106_N$ are active (e.g., the controller 410 can monitor enable signals, lines or pins associated with the various loads). Then the digital controller 410 uses an appropriate algorithm(s) and/or lookup table(s) (e.g., stored in an accessible memory 412, preferably within the disk drive system) to determine the appropriate resistance that should be programmed. The digital controller 410 can be dedicated to the above functionality. Alternatively, the digital controller can be implemented by a microprocessor that also performs other functions for a disk drive system.

For example, assume that a first load 106 requires a minimum drive voltage of 2.80V, a second load 106 requires a minimum drive voltage of 2.90V and a third load 106 requires a minimum drive voltage of 3.20V. Each load also has an associated minimum operating current. None, one, two or all three loads may be active at once. The digital controller 410 can monitor the loads, or receive notifications, to determine which loads are active at any give time (e.g., by monitoring enable signals, lines or pins associated with the loads). Based on this, the digital controller 410 can determine an optimal (or near optimal) resistance to provide using the resistor bank 410, and select the resistor(s) within resistor bank 402 accordingly. For example, if the first load (2.8V min) and the second load (2.9V min) are active, but the third load (3.2V min) is not, then the voltage at node 306 is preferably equal to or slightly above 2.9V, with sufficient current provided to drive the two out of three active loads. As different loads become active and inactive, the resistance can be accordingly changed to produce optimal or near optimal driving voltages and currents that are sufficient to drive the active load(s) without wasting power.

In summary, in the embodiment of the present invention discussed with reference to FIG. 4, a controlled adjustable resistance is placed in series between the fixed output of the voltage regulator 102 and the loads 106. While the embodiment discussed with reference to FIG. 4 is slightly more complex than the embodiment discussed with reference to FIG. 3A, it should provide for increased power savings.

Figure 3B:
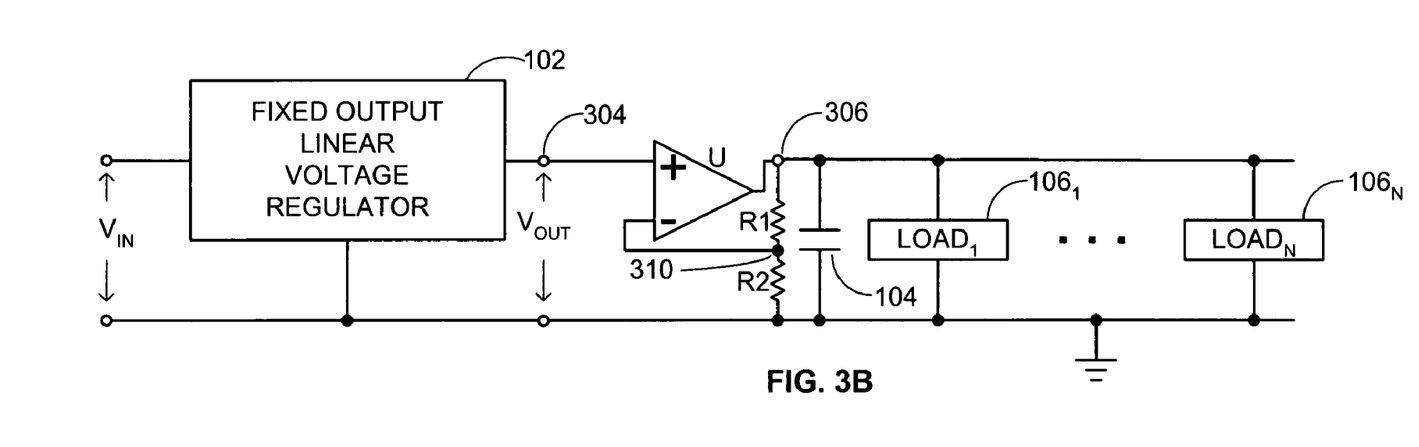

Referring now to FIG. 3B, an operational amplifier U is used in place of the resistor 302. The resistors R1 and R2 are selected (e.g., using a digital controller) such that the gain of the amplifier U is less than one (e.g., 0.80). In this manner, the voltage at node 306 is dropped below the fixed output voltage at node 304. More specifically, resistors R1 and R2 are selected such that the voltage 306 is equal to (or slightly greater than) the highest minimum operating voltage associated with the parallel loads $106_1 \ldots 106_N$.

In accordance with another embodiment of the present invention, resistor R1 and/or R2 can be adjustable, e.g., by replacing one or both of the resistors with a resistor bank similar to resistor bank 402, discussed with reference to FIG. 4. In a manner similar to that just described with reference to FIG. 4, the adjustable resistances can be used to adjust the feedback voltage at feedback node 310, to thereby allow for dynamic adjustment of the drive voltage at node 306 (which is provided to the voltage input terminals of the loads 106). For example, a digital controller (e.g., a microprocessor) can be used to dynamically adjust resistances, and thereby the drive voltage at node 306, based on which loads are active and/or based on a control signal.

Figure 3C:
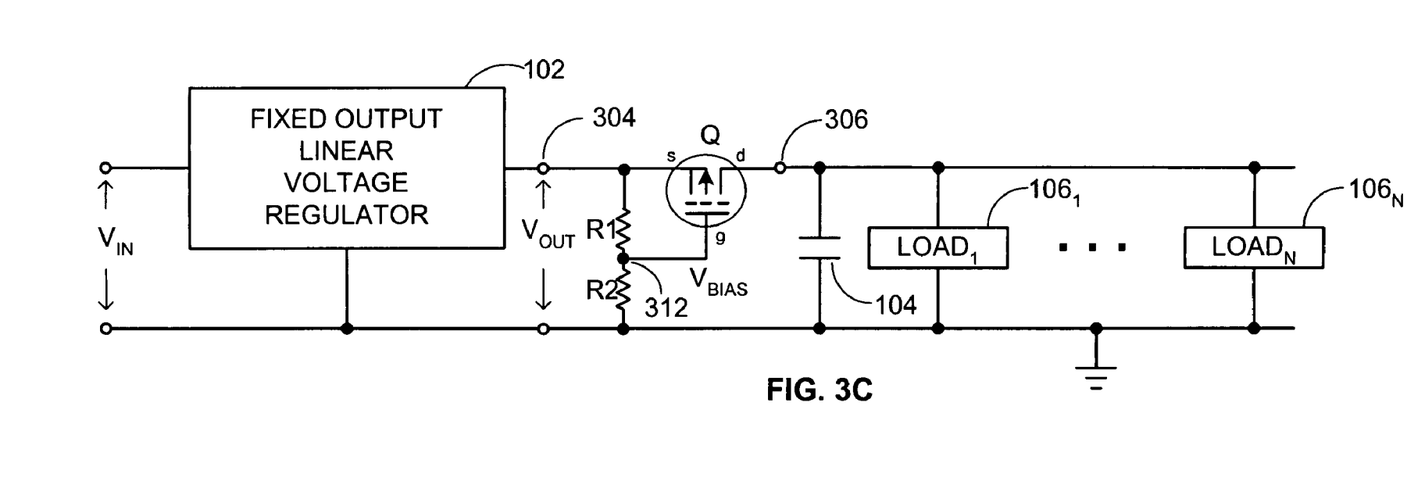

Referring now to FIG. 3C, a transistor Q is used in place of the resistor 302. In the embodiment shown, the transistor Q is a p-channel MOSFET in which the source is connected to node 304, and the drain is connected to node 306. The gate receives a biasing voltage $V_{BIAS}$ that is produced, e.g., using a voltage divider network including resistors R1 and R2. Arranged in this manner, the FET acts a voltage controlled resistor, with the resistance specified by $V_{BIAS}$. More specifically, resistors R1 and R2 are selected such that the voltage 306 is equal to (or slightly greater than) the highest minimum operating voltage associated with the parallel loads $106_1 \ldots 106_N$.

In accordance with another embodiment of the present invention, resistor R1 and/or R2 can be adjustable, e.g., by replacing one or both of the resistors with a resistor bank similar to resistor bank 402, discussed with reference to FIG. 4. In a manner similar to that just described with reference to FIG. 4, the adjustable resistances can be used to adjust the bias voltage at bias node 312, to thereby allow for dynamic adjustment of the drive voltage at node 306 (which is provided to the voltage input terminals of the loads 106). For example, a digital controller (e.g., a microprocessor) can be used to dynamically adjust resistances, and thereby the drive voltage at node 306, based on which loads are active and/or based on a control signal. Other types of transistors can alternatively be used. For example, a p-channel JFET can be used in place of the MOSFET.

In the embodiments of FIGS. 3B and 3C, the impedance of resistors R1 and R2 (or resistor banks used in their place) should be sufficiently high (i.e., multiple KΩ) that only the minimal necessary current flows across these resistors, to thereby minimize power dissipation by these resistors. For example, the total resistance of R1 and R2 is preferably at least one order of magnitude greater than the resistance produced by any of the loads $106_1 \ldots 106_N$. This is possible for the embodiment of FIG. 3B, because the input to the amplifier U does not require a large current. Similarly, in the embodiment of FIG. 3C, the gate of the transistor Q does not require a significant current.

Adjustable Output Voltage Regulators

Figure 5:
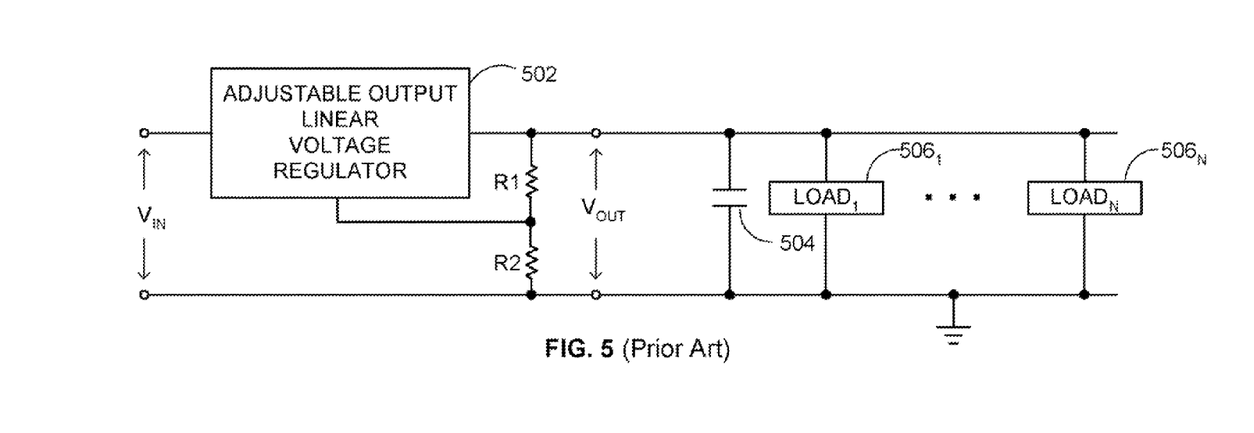
FIG. 5 is a high level block diagram that is useful for understanding how an adjustable output linear voltage regulator can be used to drive multiple loads of a disk drive device.

Adjustable output linear voltage regulators are sometimes used (rather than fixed output voltage regulators) to power disk drive systems, or at least portions of disk drive systems. With an adjustable output voltage regulator, the output voltage can be adjusted, typically using a voltage dividing resistor network to specify a feedback voltage. FIG. 5 shows an adjustable output linear voltage regulator 502 that is used to drive multiple loads $506_1 \ldots 506_N$, which can be treated as multiple parallel loads.

Figure 7:
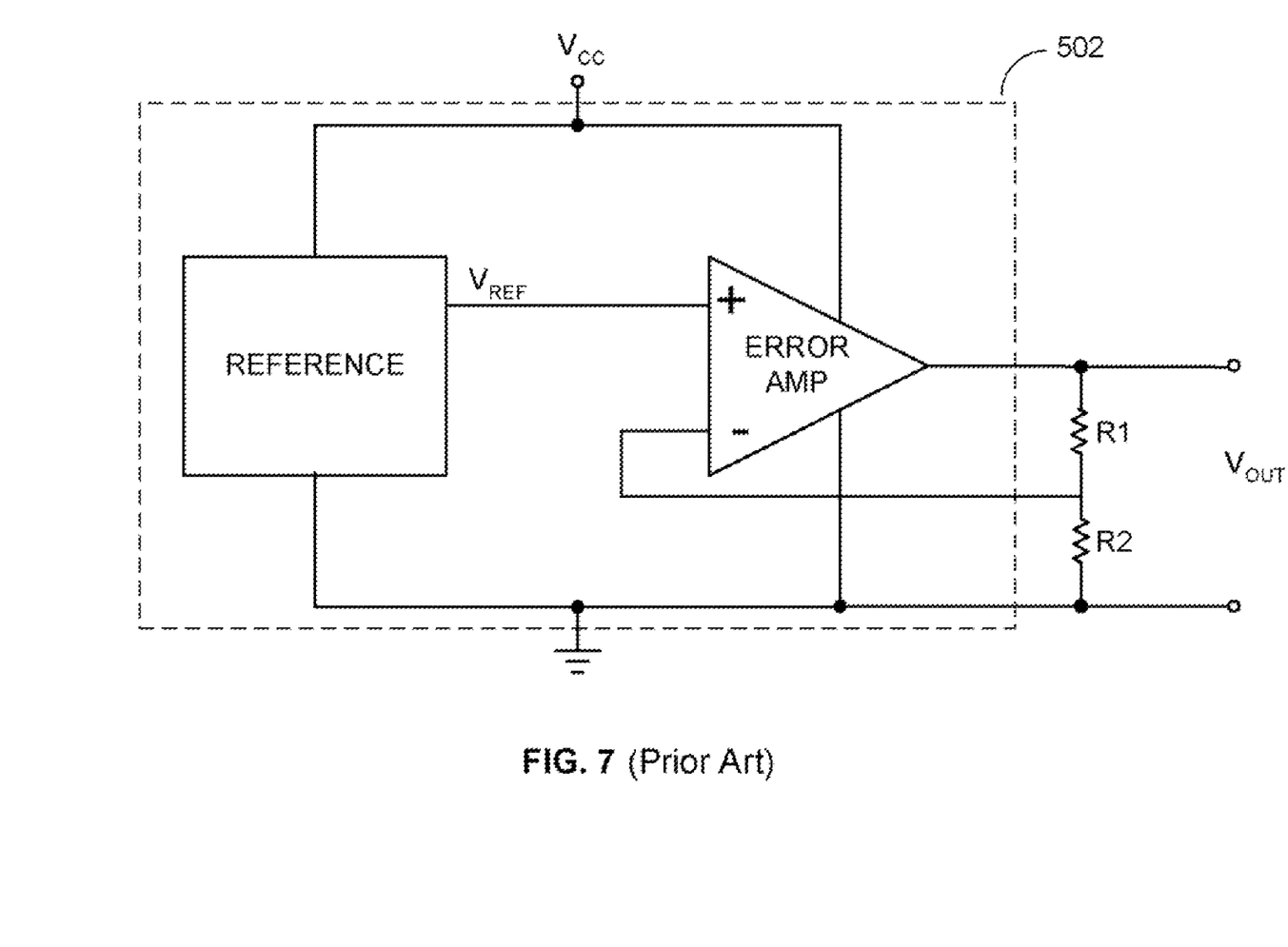
FIG. 7 is a high level functional block diagram of a typical adjustable output linear voltage regulator.

FIG. 7 is a functional block diagram of a typical adjustable output linear voltage regulator. FIG. 7 is just an exemplary model of an adjustable output linear voltage regulator, which is not meant to limit the scope of the present invention. As can be appreciated from FIG. 7, $V_{OUT} \approx V_{REF}*(1+R1/R2)$. Thus, by selecting the appropriate values for resistors R1 and R2, an appropriate power saving $V_{OUT}$ can be selected. For example, assume that the highest minimum voltage necessary from one of the parallel loads $506_1 \ldots 506_N$ (driven by the adjustable output voltage regulator 402) is 3.15V, and that the adjustable output voltage regulator (e.g., with a range of 1.2V to 5V) has a tolerance of +/−1%. Using this information, resistors R1 and R2 can be selected so that $V_{OUT}$ will be 3.19V (i.e., 3.15+ (0.01*3.15)=3.19 rounded up). While setting $V_{OUT}$ equal to or slightly above the highest minimum operating voltage may be used to reduce power dissipation, it does not take full advantage of the capabilities of an adjustable output regulator.

In accordance with an embodiment of the present invention, $V_{OUT}$ is dynamically adjusted during operation of a disk drive system, in order to further reduce power dissipation. This is accomplished, in accordance with an embodiment, using a programmable or adjustable resistor network 604 that controls $V_{OUT}$. An exemplary implementation of this is shown in FIG. 6.

Figure 6:
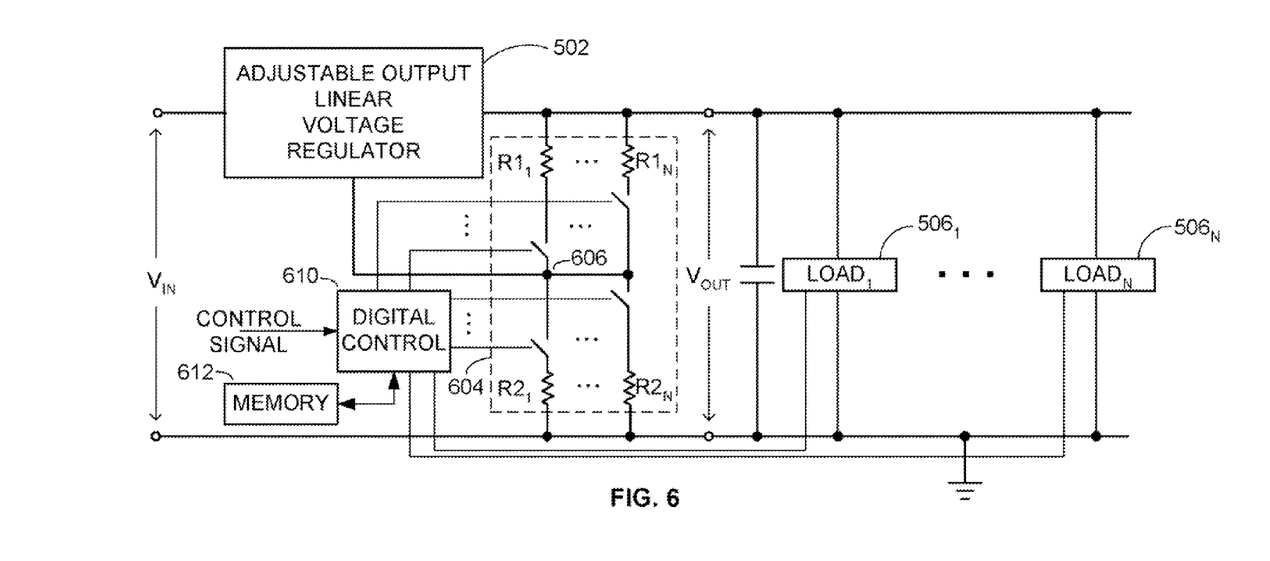
FIG. 6 is a high level block diagram that is useful for understanding further embodiments of the present invention that are useful for reducing power dissipation in an environment including an adjustable output linear voltage regulator.

In FIG. 6, the programmable resistor network 604 is shown as including banks of switchable resistors $R1_1 \ldots R1_N$ and $R2_1 \ldots R2_N$. The programmable resistor network 604 can be used to specify (i.e., set) the resistance on either side of a feedback node 606, which provides the feedback voltage for the adjustable voltage output regulator 502. The programmable resistor network 604 can include a pair of resistor banks, as shown. Each of the resistor banks can be similar to resistor bank 404, discussed above with reference to FIG. 4. In the embodiment shown, both the resistances above and below the feedback node 606 are shown as being selectable. However, it is also possible that only the resistance above node 606, or only the resistance below node 606, is adjustable.

In accordance with an embodiment of the present invention, a digital controller 610 selects the appropriate resistors within the resistor network 604. For example, the digital controller 610 receives a control signal that specifies which resistor(s) (e.g., within the resistor network 604) is/are to be selected (e.g., which switches are to be closed). Alternatively, the control signal specifies a desired resistance, and then the digital controller 610 determines and selects the appropriate resistors to achieve the desired resistance (or the closest to the desired resistance as possible). In another embodiment, the digital controller 610 receives an indication as to which of the loads $506_1 \ldots 506_N$ are active (as was discussed above with reference to FIG. 4). Then the digital controller 610 uses an appropriate algorithm(s) and/or lookup table(s) (e.g., stored in an accessible memory 612, preferably within the disk drive system) to determine the appropriate resistance that should be programmed. The digital controller 610 can be dedicated to the above functionality. Alternatively, the digital controller can be implemented by a microprocessor that also performs other functions for a disk drive system.

Exemplary Environment

Figure 8:
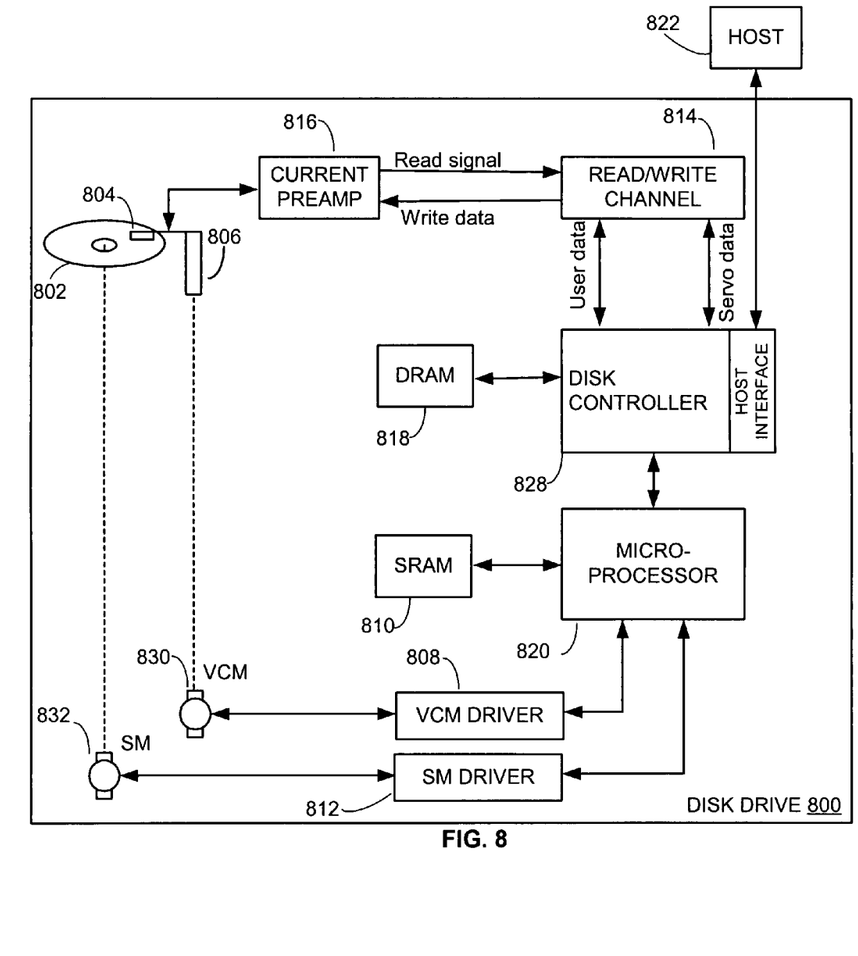
FIG. 8 is a block diagram of an exemplary disk drive system in which embodiments of the present invention are useful.

FIG. 8 illustrates an exemplary disk drive 800, in which embodiments of the present invention may be useful. The exemplary disk drive 800 includes at least one rotatable storage medium 802 (i.e., disk) capable of storing information on at least one of its surfaces. The numbers of disks and surfaces may vary from disk drive to disk drive. In a magnetic disk drive, the storage medium 802 is a magnetic disk. In an optical disk drive, the storage medium 802 would be an optical medium. An actuator arm 806, can be used to position a read/write head 804 over selected tracks of the disk 802 for reading or writing. The read/write head 804 can include one or more transducers for reading data from and writing data to a magnetic medium, an optical head for exchanging data with an optical medium, or another suitable read/write device. It should be understood that various head configurations may be used with embodiments of the present invention.

A servo system can include a voice coil motor driver 808 to drive a voice coil motor (VCM) 830 for rotation of the actuator arm 806, a spindle motor driver 812 to drive a spindle motor 832 for rotation of the disk 802, a microprocessor 820 to control the VCM driver 808 and the spindle motor driver 812, and a disk controller 828 to accept information from a host 822 and to control many disk functions. The host 822 can be any device, apparatus, or system capable of utilizing the disk drive 800, such as a personal computer or Web server. The disk controller 828 can include an interface controller in some embodiments for communicating with the host 822, and in other embodiments a separate interface controller can be used.

The microprocessor 820 can also include a servo system controller, which can exist as circuitry within the drive or as an algorithm resident in the microprocessor 820, or as a combination thereof. In other embodiments, an independent servo controller can be used. Additionally, the microprocessor 820 may include some amount of memory such as SRAM, or an external memory such as SRAM 810 can be coupled with the microprocessor 820. The disk controller 828 can also provide user data to a read/write channel 814, which can send signals to a current amplifier or preamp 816 to be written to the disk 802, and can send servo signals to the microprocessor 820. The disk controller 828 can also include a memory controller to interface with memory 818. Memory 818 can be DRAM in some embodiments that can be used as a buffer memory. The microprocessor 820 may also perform the functions of the digital controllers 410 and 610 discussed above.

Each of the blocks or components in the disk drive 800 can be thought of as loads that must be powered at certain times during operation of the disk drive 800. More specifically, all or some of these loads may be powered by voltage regulators. For example, the digital portions of the read/write channel 814, portions of the disk controller 828, and the microprocessor 820 may all require an operating voltage of about 1.2V, and thus may all be powered by a common voltage regulator. Similarly, the analog portions of the read/write channel 814, the host interface portion of the disk controller 828, and the DRAM 818 may all need an operating voltage of about 3.3V. Each block or component can receive more that one input voltage. For example, the analog portion of the read/write channel 814 may receive a first input voltage (provided by a first voltage regulator) that is different than a second input voltage (provided by a second voltage regulator) used to power the digital portions of the channel 814. Each voltage regulator may be a fixed output voltage regulator or an adjustable output voltage regulator. If a voltage regulator is a fixed output voltage regulator, then the embodiments of the present invention discussed with reference to FIGS. 3 and 4 can be used to reduce power dissipation (i.e., to save power). If a voltage regulator is an adjustable output voltage regulator, then the embodiments of the present invention discussed with reference to FIG. 6 can be used to reduce power dissipation.

Some of the blocks or components shown in FIG. 8 may be combined into a multifunctional application specific integrated circuit (ASIC). For example, the read/write channel 814, the disk controller 828, the microprocessor 820 and the SRAM 810 can all be built into a single ASIC. Such an ASIC can include one or more input voltage terminals to accept one or more driving voltages.

Although the description of disk drive 800 is more typical of a hard disk drive than an optical disk drive, embodiments of the present invention can be used in any type of rotatable media store drives including optical drives (e.g., CD and DVD drives).

The blocks or components that are active during data accesses typically consume (i.e., dissipate) a relative large amount of power. In most mobile drive applications, there is a large dwell time between data accesses. A benefit of embodiments of the present invention is that they take advantage of these dwell times by allowing the drive voltage to sag when data access occurs. More specifically, when data access occurs, the load current goes up, causing the voltage to sag. Power is saved by allowing the voltage to sag, because the current drawn or pulled is reduced. This reduction in current results in a reduction of power.

Figure 9:
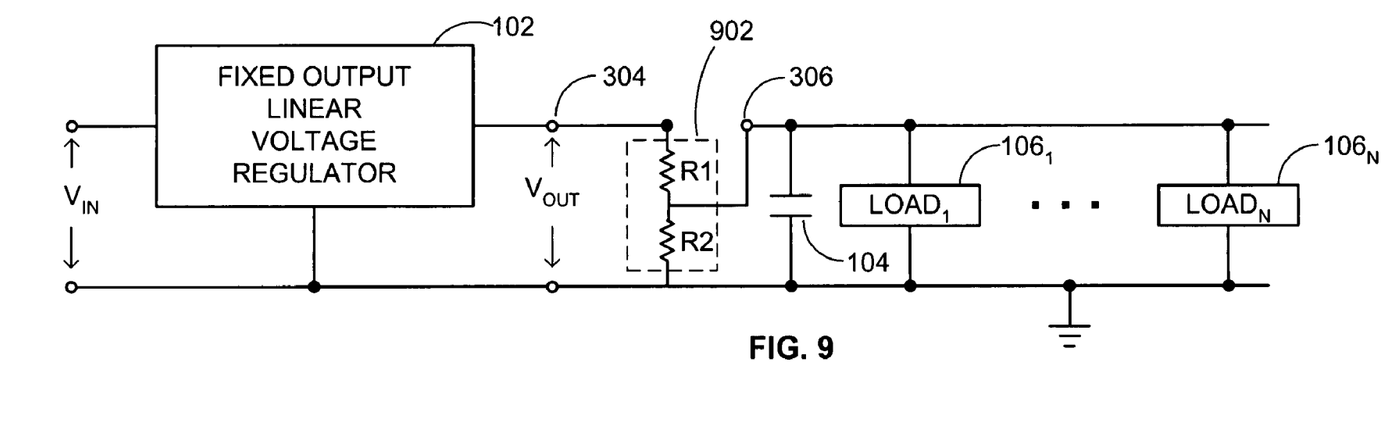
FIG. 9 is a block diagram that useful for explaining why a specific resistor type voltage divider network is not a preferred solution for reducing power dissipation in a disk drive system.

It is noted that it would not be desirable to use a simple voltage divider network including a resistor network 902 that is parallel to the loads 106, as shown in FIG. 9, with drive voltage node 306 tapped off the common terminal between the resistors R1 and R2. This is because the impedance of the resistors R1 and R2 would be too high to provide the current necessary to operate loads $106_1 \ldots 106_N$. Additionally, a significant amount of power would be dissipated by resistors R1 and R2, causing the total system power dissipation to increase rather than decrease.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

What is claimed:

1. A disk drive system, comprising:
   a fixed output voltage regulator including an output terminal that provides a substantially fixed output voltage;
   a plurality of loads, each including a voltage supply terminal; and
   an amplifier circuit configured to receive the substantially fixed output voltage of said voltage regulator and to provide a further voltage, to said voltage supply terminals of said loads, that is less than said substantially fixed output voltage of said fixed output voltage regulator, yet greater than a highest minimum operating voltage of said plurality of loads;
   wherein said amplifier circuit includes:
      an operational amplifier including a first input, a second input and an output, said first input connected to said output terminal of said fixed output voltage regulator, said output of said amplifier connected to said voltage supply terminals of said plurality of loads;
      a first resistor connected between said output of said amplifier and said second input of said amplifier; and
      a second resistor connected between the said second input of said amplifier and a low rail voltage;
      wherein said first and second resistors are selected such that a voltage at said voltage supply terminals of said plurality of loads is less than said substantially fixed output voltage of said fixed output voltage regulator, yet greater than a highest minimum operating voltage associated with said loads.

2. A disk drive system, comprising:
   a fixed output voltage regulator including an output terminal that provides a substantially fixed output voltage;
   a plurality of loads, each including a voltage supply terminal;
   a transistor including a source, a drain and a gate, said source connected to said output terminal of said fixed output voltage regulator, said drain connected to said voltage supply terminals of said plurality of loads; and
   a resistor divider network to produce a bias voltage that is provided to said gate of said transistor, said bias voltage being selected such that a voltage at said drain is less than said substantially fixed output voltage of said fixed output voltage regulator, yet greater than a highest minimum operating voltage of said plurality of loads.

3. The system of claim 2, wherein said transistor comprises a p-channel field effect transistor.

4. The system of claim 2, wherein said transistor acts as a voltage controlled resistor, said bias voltage specifying a resistance thereof.

5. The system of claim 4, wherein the resistor network includes:
   a first resistor connected between said gate and said output terminal of said voltage regulator; and
   a second resistor connected between said gate and a low rail voltage.

6. The system of claim 5, wherein said amplifier circuit is configured to have a gain of less than one.

* * * * *